Patented May 19, 1931

1,805,715

UNITED STATES PATENT OFFICE

RAINALD BRIGHTMAN, OF BLACKLEY, MANCHESTER, ENGLAND, ASSIGNOR TO IMPERIAL CHEMICAL INDUSTRIES LIMITED, OF WESTMINSTER, ENGLAND

MANUFACTURE OF AZO DYESTUFFS

No Drawing. Application filed February 12, 1930, Serial No. 427,960, and in Great Britain February 21, 1929.

This invention relates to the manufacture of valuable new disazo dyestuffs which are obtained by combining a diazotized oxamic acid derivative of a 4-amino-diphenylsulphide-4-oxamic acid of the general formula

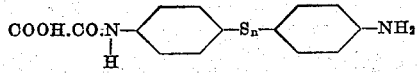

wherein $n$ represents 1 or 3 with one molecular proportion of a coupling component of such nature that the intermediate dyestuff thus obtained is capable of further combination with a component. It is immaterial how this further combination is effected. It may for instance be effected by providing that the intermediate dyestuff contains a further diazotizable amino group which is treated with nitrite and acid and coupled up with a further component or the intermediate dyestuff may be of such a nature that it is capable of combination with a further molecular proportion of a diazo compound with which it is caused to couple. The dyestuffs thus obtained may be represented by the general formula $$Y-N=N-X-N=N-Z$$

in which Y represents the residue of an oxamic acid derivative of the formula given above. X represents the divalent residue of an intermediate coupling component and Z the coupled residue of an azo dye component. By the term "coupled residue of an azo dye component" I mean the coupled residue from an azo dye coupling component or from a diazotized coupling component.

The dyestuffs obtained may be used for dyeing acetate rayon, viscose rayon, cotton and wool. The less soluble ones are especially adapted for the former fibres and the more soluble ones for the latter. They dye brownish and other shades and yield on reduction a 4:4'-aminodiphenylsulphide oxamic acid of the formula

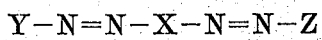

wherein $n$ represents 1 or 3; a diaminated body of the formula $X(NH_2)_2$, and an aminated compound of the formula $Z(NH_2)$ it being understood that nitro groups in the original body will be reduced to amino groups.

My invention is illustrated but not limited by the following examples, in which the parts are by weight.

*Example 1.*—The suspension of diazo compound obtained from 352 parts of 4-amino-diphenyltrisulphide-4'-oxamic acid as described in Example 5 is stirred into a solution of 112 parts of m-phenylenediamine containing 600 parts of sodium carbonate. The mixture is stirred until coupling is complete, when there is run into it a solution of p-chlorobenzene diazonium chloride obtained by diazotizing 127.5 parts of p-chloro-aniline with 250 parts of 36 per cent hydrochloric acid and 69 parts of sodium nitrite in the usual way. The mixture is maintained alkaline by the addition of further sodium carbonate if required and is stirred until coupling is complete when it is heated up and the dyestuff isolated by the addition of common salt. It dyes cellulose acetate rayon an orange-brown shade.

If the m-phenylenediamine is first combined with the diazotized oxamic acid derivative of thioaniline and finally with diazotized p-nitroaniline a dye is obtained which dyes acetate rayon reddish brown.

*Example 2.*—The suspension of diazo compound obtained from 288 parts of 4-amino-diphenyl-sulphide-4'-oxamic acid is stirred into a solution of 126 parts of m-toluylenediamine containing 400 parts of sodium carbonate. The mixture is stirred until coupling is complete when it is run into a solution containing 183 parts of 2:4-dinitroaniline diazotized in the known manner. The mixture is stirred until coupling is complete, when it is made neutral, heated up and the dyestuff filtered off. It dyes cellulose acetate rayon a warm brown shade. This dyestuff in the form of its freer acid is probably represented by the constitution

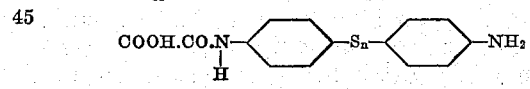

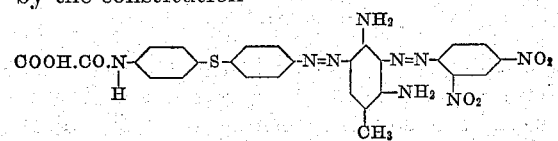

On reduction it may be resolved into 4-aminodiphenylsulphide-4'-oxamic acid, 2:3:4:5-tetraminotoluene and 1:2:4-triaminobenzene. It dissolves in water to a brown solution and in concentrated sulphuric acid to a violet blue solution. On gradual addition of water the latter solution turns redder and on sufficient dilution yields a brown precipitate.

The following table exemplifies further dyestuffs which are obtained according to my invention, the arrows pointing towards the end component in the coupling reactions.

amine and Y represents the coupled residue of an oxamic acid derivative of the formula:

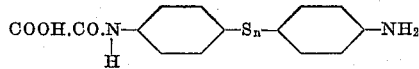

wherein $n$ represents 1 or 3; the steps which comprise coupling a diazotized oxamic acid derivative of the above formula with an intermediate coupling component and further coupling the resulting product with said diazotized amine.

3. In the process of manufacturing new azo

| | | | Colour on acetate rayon |
|---|---|---|---|
| 4-aminodiphenyl-trisulphide-4'-oxamic acid. | →Meta-phenylene diamine | ←p-anisidine | Orange brown. |
| 4-aminodiphenyl-sulphide-4'-oxamic acid. | →Meta-toluylene diamine | ←p-Amino-salicylic-acid | Orange yellow. |
| 4-aminodiphenyl-sulphide-4'-oxamic acid. | →1:5-amino-naphthol (Coupled alkaline.) | ←2:5-dichloroaniline (Coupled acid.) | Bluish pink. |

| | | | Colour on wool |
|---|---|---|---|
| 4-aminodiphenyl-sulphide 4'-oxamic acid. | →m-phenylene diamine | ←Sulphanilic acid | Orange brown. |
| 4-aminodiphenyl-sulphide 4'-oxamic acid. | →Resorcinol | ←2:6-napthylamine-sulphonic acid | Orange brown. |
| 4-aminodiphenyl-sulphide 4'-oxamic acid. | →Cresidine | ←1:5-aminonaphthol | Yellow brown. |
| 4-aminodiphenyl-sulphide 4'-oxamic acid. | →Cresidine | ←m-phenyl-enediamine | Reddish brown. |
| 4-aminodiphenyl-sulphide 4'-oxamic acid. | →α-naphthylamine | ←4-hydroxy-naphthalic-acid | Orange brown. |
| 4-aminodiphenyl-sulphide 4'-oxamic acid. | →Cleve's acid | ←2-phenylamino-8-naphthol-6-sulphonic acid. | Brown. |

| | | | Colour on cotton and viscose rayon |
|---|---|---|---|
| 4-aminodiphenyl-trisulphide-4'-oxamic acid. | →Cresidine | ←2-phenylamino-5-naphthol-7-sulphonic acid. | Violet and red violet. |

Having now particularly described and ascertained the nature of my said invention and in what manner the same is to be performed, I declare that what I claim is:—

1. In the process of manufacturing new azo dyestuffs suitable for dyeing wool, acetate rayon, viscose rayon and cotton and which may be represented by the probable formula:

$$Y-N=N-X-N=N-Z$$

wherein X represents the divalent residue of an intermediate coupling component, Z the coupled residue of an azo dye component, and Y represents the coupled residue of an oxamic acid derivative of the formula:

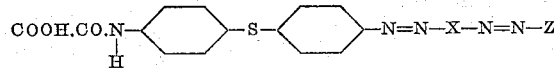

wherein $n$ represents 1 or 3; the steps which comprise coupling a diazotized oxamic acid derivative of the above formula with an intermediate coupling component and causing the result to combine with a further component.

2. In the process of manufacturing new azo dyestuffs suitable for dyeing wool or acetate rayon and represented by the probable formula $$Y-N=N-X-N=N-Z$$

in which X represents the divalent residue of an intermediate coupling component, Z represents the coupled residue of a diazotized dyestuffs suitable for dyeing acetate rayon and wool and represented by the probable formula

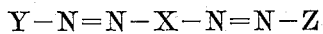

wherein X represents the divalent residue of an intermediate coupling component and Z the monovalent residue of an azo dye component; the steps which comprise coupling a diazotized 4-aminodiphenylsulphide-4'-oxamic acid with an intermediate coupling component and causing the result to combine with a further component.

4. In the process of manufacturing new azo dyestuffs suitable for dyeing acetate rayon and wool and represented by the probable formula

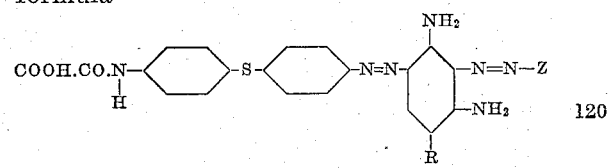

wherein R represents hydrogen or $CH_3$ and Z the monovalent residue of a diazotized amino body; the steps which comprise coupling a diazotized 4-aminodiphenylsulphide-4'-oxamic acid with a metadiamine and causing the intermediate dyestuff thus obtained to combine with a diazotized coupling component.

5. In the process of manufacturing new azo dyestuffs suitable for dyeing acetate rayon and wool and represented by the probable formula

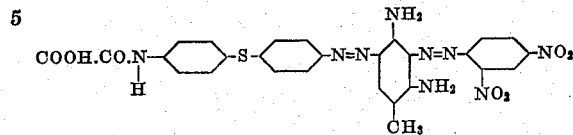

the steps which comprise coupling diazotized 4-aminodiphenylsulphide-4'-oxamic acid with meta-toluylenediamine and causing the intermediate compound thus formed to combine with diazotized dinitraniline.

6. New azo dyestuffs of the general formula $$Y-N=N-X-N=N-Z$$

wherein X represents the divalent residue of an intermediate coupling component, Z represents the coupled residue of an azo dye component and Y represents the residue of an oxamic acid derivative of the formula

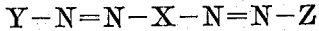

wherein $n$ represents 1 or 3, the said dyestuffs being characterized by yielding on reduction a 4-aminodiphenylsulphide-4'-oxamic acid of the formula

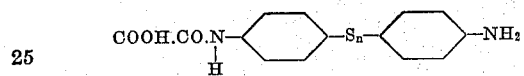

in which $n$ represents 1 or 3, a diamidated body of the formula $X(NH_2)_2$ and an amidated body of the formula $Z(NH_2)$ such dyestuffs dyeing wool, acetate rayon, viscose rayon and cotton.

7. New azo dyestuffs of the general formula

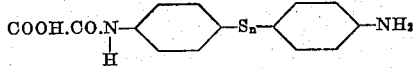

wherein X represents the divalent residue of an intermediate coupling component and Z the residue of an azo dye component; which dyestuffs are characterized by yielding on reduction a 4:4'-aminodiphenylsulphide oxamic acid of the formula

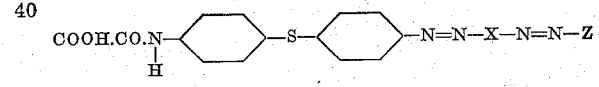

a diamidated body of the formula $X(NH_2)_2$ and an amidated body of the formula $Z(NH_2)$ such dyestuffs dyeing wool and acetate rayon.

8. New azo dyestuffs of the probable formula

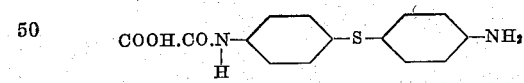

wherein R represents hydrogen or $CH_3$ and Z represents the residue of a diazotized amino body; the said dyes being characterized by yielding on reduction an oxamic acid derivative of the formula

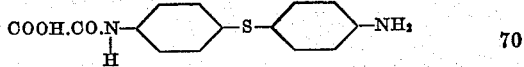

a tetramine of the formula

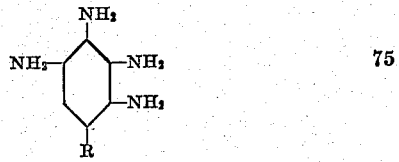

where R is hydrogen or $CH_3$ and an amidated body $Z(NH_2)$; such dyestuffs dyeing wool, acetate rayon, viscose rayon and cotton.

9. The new azo dyestuff which may be represented by the probable formula

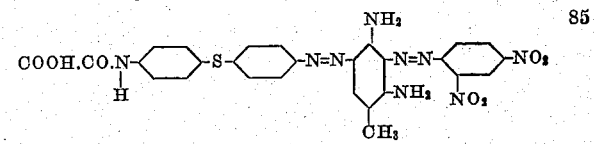

the said dyestuffs being characterized by yielding on reduction 4-amino-diphenylsulphide-4'-oxamic acid, 2:3:4:5:-tetraminotoluene and 1:2:4:-triaminobenzene, and dyeing acetate rayon reddish brown shades.

10. The new azo dyestuffs which can be represented by the probable formula

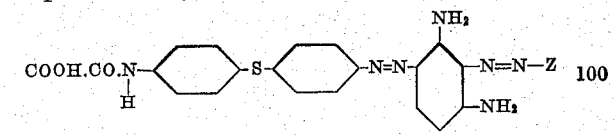

wherein Z represents the coupled residue of a diazotized coupling component selected from a group comprising $p$-chloroaniline and $p$-nitroaniline.

11. The new azo dyestuff which can be represented by the probable formula

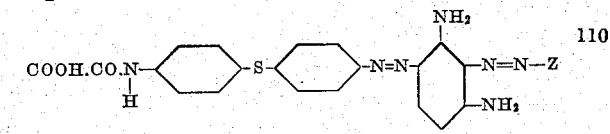

wherein Z represents the coupled residue of diazotized $p$-chloroaniline.

In testimony whereof I affix my signature.
RAINALD BRIGHTMAN.